United States Patent [19]

Pudleiner et al.

[11] Patent Number: 5,430,121
[45] Date of Patent: Jul. 4, 1995

[54] THERMOPLASTIC POLYURETHANES MODIFIED BY SILOXANE BLOCK COPOLYMERS

[75] Inventors: Heinz Pudleiner, Krefeld; Herbert Hugl, Gladbach; Rolf Dhein, Krefeld; Hanns-Peter Müller, Odenthal, all of Germany

[73] Assignee: Bayer Aktiengesellschaft, Leverkusen, Germany

[21] Appl. No.: 169,096

[22] Filed: Dec. 17, 1993

[30] Foreign Application Priority Data

Dec. 23, 1992 [DE] Germany ............... 42 43 799.7

[51] Int. Cl.⁶ .................................. C08L 75/00
[52] U.S. Cl. .................................. 528/28; 528/29; 528/25; 525/439; 525/454; 525/464
[58] Field of Search ............ 528/28, 29, 25; 525/439, 454, 464

[56] References Cited

U.S. PATENT DOCUMENTS

| | | | |
|---|---|---|---|
| 3,562,352 | 2/1971 | Nyilas | 260/824 |
| 3,975,350 | 8/1976 | Hudgin et al. | 260/30.4 N |
| 4,454,309 | 6/1984 | Gould et al. | 525/454 |
| 4,518,758 | 5/1985 | Cavezzan et al. | 528/12 |
| 4,647,643 | 3/1987 | Zdrahala et al. | 528/28 |
| 4,675,361 | 6/1987 | Ward, Jr. | 525/92 |

FOREIGN PATENT DOCUMENTS

| | | |
|---|---|---|
| 422693 | 4/1991 | European Pat. Off. |
| 5978236 | 5/1984 | Japan . |
| 60-252617 | 12/1985 | Japan . |
| 2140438 | 11/1984 | United Kingdom . |
| 8601813 | 3/1986 | WIPO . |

*Primary Examiner*—Melvyn I. Marquis
*Assistant Examiner*—Helen F. Lee
*Attorney, Agent, or Firm*—Joseph C. Gil; N. Denise Brown

[57] ABSTRACT

The invention relates to thermoplastic polyurethanes modified with segmented siloxane block copolymers which are based on relatively high molecular weight dihydroxy compounds, diisocyanates, and difunctional chain extenders. The application also relates to their use in the medical field, and particularly as a catheter material.

9 Claims, No Drawings

THERMOPLASTIC POLYURETHANES MODIFIED BY SILOXANE BLOCK COPOLYMERS

BACKGROUND OF THE INVENTION

This invention relates to thermoplastic polyurethanes modified by siloxane block copolymers, to a process for their production, and to catheters produced therefrom.

Thermoplastic polyurethane elastomers (TPU's) have long been known. They are of commercial significance by virtue of their combination of excellent mechanical properties with the known advantages of inexpensive thermoplastic processability. A wide range of mechanical properties can be established through the use of different chemical synthesis components. A review of TPU's, their properties and their applications can be found, for example, in Kunststoffe 68 (1978), pages 819 to 825 and in Kautschuk, Gummi, Kunststoffe 35 (1982), pages 568 to 584.

Various attempts have already been made to produce TPU's which exhibit the unique surface properties of polysiloxanes, such as, for example, water repellency, anti-adhesive properties, compatibility with blood, reduced abrasion and reduced hardness. TPU's with these surface properties are desirable.

One method is to mix TPU's with polysiloxanes. On account of the poor compatibility of polysiloxanes with synthetic polymers, the siloxanes have to be modified. One possibility is to use siloxanes containing vinyl-polymerizable double bonds as described in, for example, Japanese Patent 59/78236; 1984. According to U.S. Pat. No. 4,675,361 (believed to be an equivalent to British Patent A 2,140,438), polyurethanes containing polydialkyl siloxanes are used as additives for blood-compatible base polymers. Only hydroxyalkylterminated siloxanes are mentioned as non-polar soft segments. The disadvantage of such a compound lies in the large quantity of polysiloxane needed to improve the surface properties. In addition, the production process of such a compound is very complicated.

Another possible solution which has already been described lies in the use of the soft polysiloxane as a non-polar soft segment in a thermoplastically processable elastomer (see Japanese Patent 60/252 617, and U.S. Pat. No. 4,518,758). Due to the high molecular weight of the siloxane components, a considerable quantity of siloxane has to be used. However, this high siloxane content disturbs the phase morphology to such an extent that the mechanical properties of the elastomer deteriorate.

U.S. Pat. No. 3,562,352 describes polysiloxane-containing block copolymers in which polysiloxane blocks and polyurethane blocks are directly attached to one another by Si-N bonds. However, the materials produced are not thermoplastic polyurethanes.

In addition, U.S. Pat. No. 4,647,643 describes non-blocking soft polyurethanes containing from 1 to 15% by weight of polyoxyalkylenelsiloxane block copolymers. These materials are also described as non-tacky and non-toxic, and may be suitable for medical equipment, such as tubes, blood bags and implants.

The hardness of TPU's produced from linear polyhydroxy compounds, diisocyanates and diols is adjusted through the content of socalled hard phase which consists essentially of diisocyanate and short-chain diols. In practice, however, the production of TPU's having relatively low hardness is complicated by sticking in the machine and by poor demoldability. TPU's having relatively low hardness generally also suffer from reduced mechanical properties and increased compression set values.

The incorporation of isocyanates consisting of various geometric isomers, for example 4,4'-bis-(isocyanatocyclohexyl)-methane, has a particularly unfavorable effect in soft thermoplastic polyurethanes. The TPU's produced from these types of isomers generally consist of very slowly recrystallizing hard segments and, accordingly, give products with poor demolding properties.

The most significant thermoplastic polyurethanes used in the medical field are aromatic TPU's. It is suspected that in the use of these aromatic TPU's that, unless processing is optimal, 4,4'-bis-(aminophenyl)-methane (i.e. MDA)is formed after long-term use (i.e. more than 30 days). Although there are also cycloaliphatic TPU's which do not have this problem, they nevertheless present processing difficulties due to the poorly recrystallizing hard segments. The surface tackiness values shown in Table 2 were measured by comparison with known cycloaliphatic TPU's.

In addition, thermoplastic polyurethanes are ideally suitable for biomedical applications, and particularly for catheters. Since catheters are inserted into the body, the ideal catheter should have above all a high bending modulus, shear modulus or high rigidity at room temperature.

This applies in particular to intravenous catheters which are directly inserted into the bloodstream through the skin. Since ease of insertion is particularly important for the placing of the catheter, intravenous catheters are made of high-modulus materials, such as, for example, polytetrafluoroethylene, poly(chlorotrifluoroethylene), fluorinated ethylene/propylene copolymer or the like. However, when the catheter is placed in the correct position in the vein, its rigidity or high modulus level is a disadvantage. The rigidity of the catheter can result in damage to the inner wall of the blood vessels by the tip of the catheter.

A very soft, rubber-like material would be less likely to damage the inner wall of the blood vessels. It could also be left in the vein for a longer period without having to be replaced or repositioned elsewhere. However, a flexible catheter with these advantages would not be so easy to insert into the body. Accordingly, there is a need for a catheter which can be easily inserted into and positioned in the bloodstream without damaging the inner walls of blood vessels.

The ideal catheter composition has a high modulus or rigidity at room temperature during the insertion and positioning phase of the catheter, and softens in the bloodstream at body temperature. This preliminary softening process should take place as quickly as possible in order to minimize the above-described risk of damage within the blood vessels. However, the catheter should not soften to such an extent that the material used loses most of its mechanical strength, as this would pose a danger of parts of the catheter remaining in the blood-stream and blood vessels in the event of failure of the material upon removal of the catheter.

Various methods have already been adopted to achieve the preliminary softening at body temperature.

Water-absorbing polyurethanes are known from U.S. Pat. No. 3,822,238. They are produced from polymers with a low carbon to oxygen to nitrogen ratio, or polymer chains containing quaternary ammonium or salt-containing groups and small quantities of isocyanate. According to the patent, these polymers may be used as coatings or membranes or may be formed by casting into body implants. Of the many polymers claimed, there is not one that would be particularly suitable for medical implants. In addition, the properties which polymers for implants are required to exhibit are not mentioned.

It is known from U.S. Pat. No. 3,975,350 that hydrophilic crosslinked polyurethane systems can be useful as supports for drug release, as coatings or for implants, such as catheters and cannulas. However, there is no mention of which polyurethanes would be useful for implants.

U.S. Pat. No. 4,454,309 describes a polymer mixture consisting of a hydrophilic polyurethane and a polyolefin from the group of polyalkyl esters and polyacrylic acid esters. This mixture is said to be suitable for a number of applications, including catheters and cannulas.

PCT WO 86/01813 describes multi-phase polymer mixtures consisting of a non-hydrophilic polymer, such as polyurethane for example, and a hydrophilic polymer component. The softening and swelling of the polymer mixture by absorption of water are described as advantages of these mixtures. In the event of complete hydration measured after 24 h, a softening ratio of 2:1 is achieved.

Polymer blends preferably consisting of phenoxy resin as plasticizer and polyester urethanes with selected softening temperatures between room temperature and 62° C. are known from European Pat. No. 422,693. These mixtures are proposed as suitable materials for medical articles.

The described systems have certain disadvantages. Thus, most polymers cannot form catheters by standard methods because they are not thermoplastic materials. However, the main disadvantage is that the materials are softened by absorption of water.

This process is controlled by diffusion and, accordingly, takes much longer than softening due to an increase in temperature. Accordingly, softening by the increase from room temperature to body temperature seems more advantageous. In addition, multi-phase systems such as those described hereinabove generally lack optical transparency.

Beyond the known properties of siloxane components modified by polyurethane surfaces, none of the above references describe the polyurethanes claimed in the present invention with the surprising property of softening of body temperature. In addition, the described processes are unsuitable for the production of catheters by thermoplastic processing techniques known per se. The incorporation of polysiloxanes, particularly in soft plastics with hardness values below 100 Shore A, is aimed at the anti-blocking properties after extrusion or injection molding. It could not be expected from the teaching of U.S. Pat. No. 4,647,643 that siloxane block copolymers would also be suitable for meeting the needs mentioned above.

Accordingly, the problem addressed by the present invention was to economically combine the favorable mechanical properties of a TPU with the particular properties of a polysiloxane to obtain thermoplastically processable products which would be easier to process than the cycloaliphatic TPU's of the prior art and which, in addition, would soften at body temperature.

DESCRIPTION OF THE INVENTION

The present invention relates to segmented thermoplastic polyurethanes modified with siloxane block copolymers and based on relatively high molecular weight dihydroxy compounds, diisocyanates, and difunctional chain extenders. These segmented thermoplastic polyurethanes modified with siloxane block copolymers comprise the reaction product of a) a relatively high molecular weight dihydroxy compound having a molecular weight of from 800 to 8,000, and preferably in the range from 1,000 to 4,000;

b) at least one isocyanate corresponding to the general formula:

OCN—Z—NCO, wherein Z represents: a difunctional organic radical;

c) at least one difunctional chain extender; and d) at least one substantially linear hydroxy-terminated polyol corresponding to the following formula:

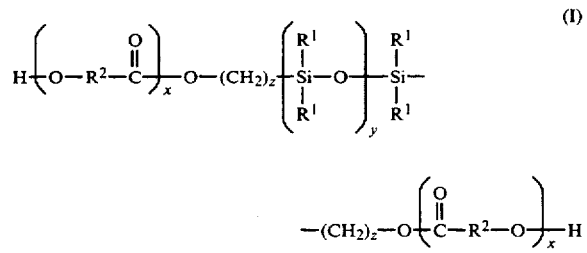

(I)

wherein x represents: an integer of from 1 to 30, y represents: an integer of from 1 to 50, z represents: an integer of from 2 to 4, $R^1$ represents: a $C_{1-6}$ alkyl group or a phenyl group, and $R^2$ represents: a $C_{2-8}$ alkylene group.

The substantially linear hydroxyl-terminated polyol is preferably a polyether, a polycarbonate, or mixtures thereof, and preferably has a molecular weight in the range of from 1,000 to 4,000.

The difunctional chain extenders are preferably aliphatic diols having from 2 to 14 carbon atoms or cycloaliphatic diamines having from 2 to 14 carbon atoms. Particularly preferred chain extenders include ethylene glycol, butane diol, hexane diol, 1,4-di-(b-hydroxyethyl)-hydroquinone and isophorone diamine, 4,4'-dicyclohexylmethane diamine.

TPU's can be produced continuously or discontinuously. The most well-known production processes are the so-called belt process and the extruder process which are also applied on an industrial scale.

The present invention also relates to a process for the production of the thermoplastic polyurethane elastomers according to the invention, in which synthesis components a) to d) are reacted, optionally in the presence of catalysts, auxiliaries and/or additives, in quantities such that the equivalent ratio of NCO groups of the diisocyanates to the sum of the NCO-reactive groups of components a), c) and d) is between 0.85 and 1.2:1, and preferably between 0.95 and 1.1:1.

Suitable polyetherols for the invention can be produced by reacting one or more alkylene oxides containing 2 to 4 carbon atoms in the alkylene radical with a starter molecule containing two active hydrogen atoms in bound form. Suitable alkylene oxides include, for example, ethylene oxide. 1,2-propylene oxide, epichlorohydrin and 1,2- and 2,3-butylene oxide. Ethylene oxide, propylene oxide and mixtures of 1,2-propylene oxide and ethylene oxide are preferably used. The alkylene oxides may be used individually, alternately one after the other, or in the form of mixtures. Suitable starter molecules include, for example, water, aminoalcohols, such as, for example, N-alkyl diethanolamines, such as, for example, N-methyl diethanolamine, and diols, such as, for example, ethylene glycol, 1,3-propylene glycol, butane-1,4-diol and hexane-1,6-diol. Mixtures of starter molecules may also be used. Other preferred polyetherols include the hydroxyfunctional polymerization products of tetrahydrofuran.

The substantially linear polyetherols have molecular weights in the range from 800 to 8,000 and, more preferably, in the range from 1,000 to 4,000. They may be used both individually, and in the form of mixtures with one another.

Suitable polyesterols may be produced, for example, from $C_{2-12}$ and preferably $C_{4-6}$ a carboxylic acids and polyhydric alcohols. Suitable dicarboxylic acids include, for example, aliphatic dicarboxylic acids, such as, for example, succinic acid, glutaric acid, adipic acid, suberic acid, azelaic acid and sebacic acid, and aromatic dicarboxylic acids, such as, for example, phthalic acid, isophthalic acid and terephthalic acid. The dicarboxylic acids may be used either individually or in the form of mixtures, for example, in the form of a mixture of succinic, glutaric and adipic acid. To produce the polyesterols, it may be of advantage to use the corresponding dicarboxylic acid derivatives instead of dicarboxylic acids, such as, for example, carboxylic acid diesters containing 1 to 4 carbon atoms in the alcohol radical, carboxylic anhydrides or carboxylic acid chlorides. Examples of polyhydric alcohols include glycols containing from 2 to 10, and preferably 2 to 6 carbon atoms, such as, for example, ethylene glycol, diethylene glycol, butane-1,4-diol, pentane-1,5-diol, hexane-1,6-diol, decane-1,10-diol, 2,2-dimethylpropane-1,3-diol, propane-1,3-diol and dipropylene glycol. Depending on the required properties, the polyhydric alcohols may be used individually or even in admixture with one another.

Esters of carbonic acid with the diols mentioned hereinabove, particularly diols containing 4 to 6 carbon atoms, such as, for example, butane-1,4-diol and/or hexane-1,6-diol, condensates of w-hydroxycarboxylic acids, for example w-hydroxycarboxylic acid, and preferably polymerization products of lactones, for example, optionally substituted w-caprolactones, are also preferred.

Particularly preferred polyesterols are butane-1,4-diol polyadipates, hexane-1,6-diol neopentyl glycol polyadipates, hexane-1,6-diol/butane-1,4-diol polyadipates, polycaprolactones and hexane diol polycarbonate.

The polyesterols have molecular weights in the range from 800 to 8,000 and preferably in the range from 1,000 to 4,000.

Suitable organic diisocyanates b) include, for example, aliphatic and cycloaliphatic diisocyanates, of which the following are mentioned by way of example: aliphatic diisocyanates, such as hexamethylene diisocyanate, and cycloaliphatic diisocyanates, such as isophorone diisocyanate, 1,4-cyclohexane diisocyanate, 1-methyl-2,4- and -2,6-cyclohexane diisocyanate and the corresponding isomer mixtures, 4,4'-, 2,4'- and 2,2'-dicyclohexyl methane diisocyanate and the corresponding isomer mixtures. Cycloaliphatic diisocyanates are preferred.

Suitable compounds to be used as the chain extending agents, component c), include difunctional compounds such as, for example, aliphatic diols and aliphatic, cycloaliphatic, and aromatic diamines. These chain-extending agents preferably have molecular weights in the range from 60 to 300. Suitable aliphatic diols preferably contain from 2 to 14 carbon atoms and include compounds such as, for example, ethane diol, hexane-1,6-diol, dimethylene glycol, dipropylene glycol and butane-1,4-diol. Other suitable chain-extending agents include the diesters of terephthalic acid with glycols containing 2 to 4 carbon atoms such as, for example, terephthalic acid bisethylene glycol or butane-1,4-diol; hydroxyalkylene ethers of hydroquinone such as, for example, 1,4-di-(1-hydroxyethyl)-hydroquinone.

It is also possible to use difunctional diamines as the chain extending agent. Suitable difunctional diamines include, for example, aliphatic diamines such as, for example, ethylene diamine, 1,2- and 1,3-propylene diamine. N-methyl-1,3-propylene diamine, and N,N'-dimethyl ethylene diamine; cycloaliphatic diamines such as, for example, isophorone diamine; and aromatic diamines such as, for example, 2,4- and 2,6-tolylene diamine, 3,5-diethyl-2,4- and/or-2,6-tolylene diamine and primary ortho-, di-, tri- and/or tetra-alkyl substituted 4,4'-diaminodiphenyl methanes. It is particularly preferred to use butane-1,4-diol as component c).

To adjust the hardness and melting point of the TPU's, the molar ratios in which components a), c), and d) are used may be varied within relatively wide limits. Molar ratios of polyhydroxyl compounds a) and d) to chain-extending agents c) of from 1:1 to 1:12 and, more particularly, from 1:1.8 to 1:4.4 have proved to be suitable. The hardness and melting point of the TPU° s increases as the quantity of chain extending agent increases. It is possible to produce products having hardness values in the range from 70 Shore A to 75 Shore D, and, more particularly, in the range from 70 Shore A to 55 Shore D.

To produce the TPU's, the synthesis components a) to d) may be reacted, optionally in the presence of catalysts, auxiliaries and/or additives in such quantities that the equivalent ratio of NCO groups of the diisocyanates to the sum of the NCO-reactive groups, particularly the OH groups, of components a), c), and d)is 1:0.85 to 1.20 and preferably 1:0.95 to 1:1.1.

Suitable catalysts, which in particular accelerate the reaction between the NCO groups of the diisocyanates b) and the isocyanate reactive groups of synthesis components a ), c ) and d ), are the tertiary amines known from the prior art such as, for example, triethyl amine, dimethyl cyclohexyl amine, N-methyl morpholine, N,N'-dimethyl piperazine, 2-(dimethylaminoethoxy)-ethanol, diazabicyclo-(2,2,2)-octane, and the like and, in particular, organometallic compounds, such as, for example, titanic acid esters, iron compounds, tin compounds, such as, for example, tin diacetate, tin dioctoate, tin dilaurate, or the tin dialkyl salts of aliphatic carboxylic acids, such as, for example, dibutyl tin diacetate, dibutyl tin dilaurate or the like. The catalysts are typically used in quantities of 0.005 to 0.1 part to 100 parts polyhydroxyl compound.

in addition to catalysts, auxiliaries and/or additives be incorporated in the synthesis components, examples of suitable auxiliaries and/or additives include lubricants, inhibitors, stabilizers against hydrolysis, light, heat and discoloration, flameproofing agents, dyes, pigments, inorganic and/or organic fillers and reinforcing materials.

Further particulars of the auxiliaries and additives mentioned hereinabove can be found in the literature, for example in J. H. Saunders and K. C. Frisch: "High Polymers", Vol. XVI, Polyurethanes, Parts 1 and 2, Interscience Publishers, 1962 and 1964 and in DE-A 29 01 774.

Polysiloxane/polylactone block copolymers corresponding to Formula I are known products and may be produced by methods known per se. A silane corresponding to Formula (II):

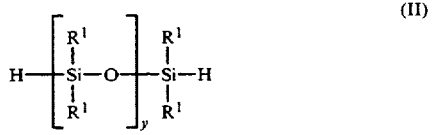

wherein y represents: an integer of from 1 to 50

R' represents: a $C_{1-6}$ alkyl group or a phenyl group is reacted in a ratio of 1:2 with an unsaturated, aliphatic or cycloaliphatic alcohol such as, for example, allyl alcohol, buten-1-ol or penten-1-ol in the presence of a catalyst such as, for example, hexachloroplatinic acid. Various quantities of caprolactone, g-butyrolactone or e-valerolactone or mixtures thereof can be added onto the bifunctional hydroxy-terminated polydimethyl siloxane in the presence of a tin octoate catalyst, where the ratio by weight of siloxane to lactone is determined by the block length of the lactone.

Products such as these are commercially available from Th. Goldschmidt (Essen) under the names of Tegomer 6110, 6120, 6140 and 6160. Tegomers are bifunctional hydroxy-terminated polycaprol actone-poly(-dimethylsiloxane)-polycaprol actone tri block copolymers.

Common bifunctional hydroxy-terminated nonblock polydimethylsiloxanes are immiscible (incompatible) with the other synthesis components, so that there is insufficient incorporation of the polydimethylsiloxane into the polymer back bone, which leads to low molecular weight and poor mechanical properties, such as tensile strength, elongation, compression set. The good mechanical properties of the polymers of the present invention, that contain up to 20 % by weight of the siloxane blockcopolymer, give evidence for the incorporation of this component into the polymer.

In addition, the block structure of the siloxane copolymer improves compatibility with the other TPU components during the synthesis process and facilitates incorporation of the siloxane copolymer.

The reduction in surface tackiness, as a function of time, of the TPU's produced in the Examples by comparison with a commercial product based on cycloaliphatic TPU's is shown in Table 2.

As can readily be seen, the surface tackiness of the melt assumes virtually its final value after only about 1.5 minutes in the case of the TPU's according to the invention. By contrast, the siloxane-free TPU's (i.e. comparisons) remain tacky for up to about 6 minutes while those containing standard siloxane (also comparison) only reach the final level after about 3.5 minutes starting from a low level.

This polyurethane, which can also be processed for-example in mixtures with other thermoplastics and elastomers by injection molding, extrusion, coating and fiber production, may be used in the medical field by virtue of its surface properties (i.e. compatibility with blood). The material is particularly suitable for catheters.

The invention is further illustrated by the following Examples and Tables. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts are parts by weight.

TABLE 1

| Example | Diisocyanate (g)**) | Chain extender | Siloxane block copolymer (g)**) | Polyol |
|---|---|---|---|---|
| 1 | 782.8 | 207.2 | 440 | 770 (Desmophen 2020 ®****) |
| 2 | 803 | 209.5 | 450 | 787.5 (Terathane 2000 ®*****) |
| 3 | 783.28 | 206.7 | 60.5 | 1149.5 (Terathane 2000 ®*****) |
| 4 | 785.0 | 205.0 | 60.5 | 1149.5 (Desmophen 2020 ®****) |
| 5*) | 718.7 | 161.3 | — | 1320 (Terathane 2000 ®*****) |
| 6*) | 782.24 | 207.5 | 107.6******) | 1102.4 (Terathane 2000 ®*****) |

*)Examples 5 and 6 do not correspond to the invention

**)Desmodur W ®, a diisocyanate ($H_{12}$-MPI) of Bayer AG

***)Tegomer H-Si 6110 ®, a caprolactone/polydimethyl siloxane/caprolactone block copolymer commercially available from Goldschmidt AG. Essen

****)Desmophen 2020 ®, a hexane diol polycarbonate commercially available from Bayer AG

*****)Terathane 2000 ®, a polytetramethylene glycol commercially available from DuPont

******)Tegomer H-Si 2311 ®, a polydimethyl siloxane commercially available from Goldschmidt AG. Essen The diisocyanate used is Desmodur W (4,4'-dicyclohexyl methane diisocyanate).

The chain extender used is butane-1,4-diol.

TABLE 2

| | Surface tackiness after the activation (10 minutes at 150° C.) in N/mm² | | | | | | |
|---|---|---|---|---|---|---|---|
| Time/minute | Example 1 | Example 2 | Example 3 | Example 4 | Example 5 | Example 6 | Tecoflex*) EG 85 A |
| 1,5 | 0,20 | 0,15 | 0,19 | 0,18 | 0,55 | 0,30 | 0,90 |
| 2,5 | 0,18 | 0,18 | 0,18 | 0,18 | 0.50 | 0,27 | 0,94 |
| 3,5 | 0,16 | 0,20 | 0,18 | 0,18 | 0,47 | 0,22 | 0,93 |
| 5 | 0,18 | 0,18 | 0.18 | 0,17 | 0,25 | 0,15 | 0,86 |
| 6 | 0,16 | 0,15 | 0,17 | 0,16 | 0,22 | 0,15 | 0,40 |

*)Tecoflex EG 85A is a trade name of Thermedics Inc., Woburn. It is a comercially available TPU on the bases of 4,4'-dicyclohexyl methane diisocyanate, polytetrahydrofuran 1000, butane-1,4-diol.

EXAMPLES

Example 1: (Semiprepolymer process)

In a 2 liter face-ground flask equipped with a stirrer and reflux condenser, 770 g hexane diol polycarbonate (having an OH number of 53.8 and a functionality of 2) and 440 g poly-e-caprolactone/polydimethyl siloxane block copolymer (i.e. Tegomer 6110 ®) (having an OH number of 56.1 and a functionality of 2) were dehydrated for 1 hour at 120° C./14 mbar. 0.11 g dibutyl tin dilaurate and 782.8 g 4,4'-diisocyanatodicyclohexyl methane containing approx. 20% by weight of the trans,trans isomer were then introduced and the mixture was stirred at 120° C. An NCO value of 9.72% by weight was reached after 3 hours. 8.8 g ethylene-bis-stearyl amide and 11.0 g 2,6-ditert. butyl cresol (ionol) were then dissolved and 207.2 g butane-1,4-diol were added.

After homogenization, the mixture was poured onto Teflon trays and heated for 12 hours at 100° C. The sheet obtained was size-reduced, homogenized by extrusion and injection-molded to test specimens.

The product had the following properties:

| Hardness (Shore A) | 91 |
|---|---|
| Modulus 100% | 10.5 [Nmm$^{-2}$] |
| Modulus 300% | 28 [Nmm$^{-2}$] |
| Ultimate tensile stress | 48.5 [Nmm$^{-2}$] |
| Elongation at break | 395% |
| Preliminary softening at 22° C. | |

Example 2

A mixture of 787.5 g polytetramethylene glycol (Terathane 2000 ®) (having an OH number of 56.1, and a functionality of 2) and 450 g poly-e-caprolactone/polydimethyl siloxane block copolymer (Tegomer 6110 ®) (having an OH number of 56.1, and a functionality of 2) was dehydrated as described hereinabove in Example 1 and prepolymerized with 0.11 g dibutyl tin dilaurate and 803 g 4,4'-diisocyanatodicyclohexyl methane to an NCO content of 9.74% by weight. 9 g ethylene-bis-stearyl amide, 11.25 g 2,6-ditert.butyl cresol and 0.11 g dibutyl tin dilaurate were dissolved and the prepolymer was chain-extended with 209.5 g butane-1,4-diol. After processing to test specimens, the following properties were determined:

| Properties: | |
|---|---|
| Hardness (Shore A) | 86 |
| Modulus 100% | 8.9 [Nmm$^{-2}$] |
| Modulus 300% | 16.2 [Nmm$^{-2}$] |
| Ultimate tensile stress | 43.3 [Nmm$^{-2}$] |
| Elongation at break | 510% |
| Preliminary softening at 33.5° C. | |

Example 3

A mixture of 1149.5 g polytetramethylene glycol 2000 (Terathane 2000 ®) (having an OH number of 56.1 and a functionality of 2) and 60.5 g poly-e-caprolactone/polydimethyl siloxane block copolymer (Tegomer 6110 ®) (having an OH number of 56.1 and a functionality of 2) was dehydrated and prepolymerized with 0.11 g dibutyl tin dilaurate and 783.28 g 4,4'-diisocyanatodicyclohexyl methane at 120° C to an NW content of 10.03% by weight. After the addition of 11 g 2,6-ditert.butyl cresol, 0.11 g dibutyl tin dilaurate and 8.8 g ethylene bis-stearyl amide, the product was chain-extended with 206.7 g butane-1,4-diol.

| Properties: | |
|---|---|
| Hardness (Shore A) | 86 |
| Modulus 100% | 8.9 [Nmm$^{-2}$] |
| Modulus 300% | 16.2 [Nmm$^{-2}$] |
| Ultimate tensile stress | 43.3 [Nmm$^{-2}$] |
| Elongation at break | 510% |
| Preliminary softening at 28° C. | |

Example 4

In a 2 liter face-ground flask equipped with an anchor stirrer and reflux condenser, a mixture of 1149.5 g hexane diol polycarbonate (Desmophen 2020 ®) (having an OH number of 53.8 and a functionality of 2) and 60.5 g poly-e-caprolactone/polydimethyl siloxane block copolymer (Tegomer 6110 ®) (having an OH number of 56.1 and a functionality of 2) was dehydrated for 1 hour at 120° C./14 mbar. 785 g 4,4'-diisocyanatodicyclohexyl methane (trans,trans content: approx. 20% by weight) and 0.11 g dibutyl tin dilaurate were then added and the mixture was prepolymerized at 120° C. 11 g 2,6-ditert.butyl cresol, 8.8 g ethylene bis-stearyl amide and 0.11 g dibutyl tin dilaurate were dissolved and the prepolymer was chain-extended with 205.0 g butane-1,4-diol.

| Properties: | |
|---|---|
| Hardness (Shore A) | 91 |
| Modulus 100% | 11.6 [Nmm$^{-2}$] |
| Modulus 300% | 39.1 [Nmm$^{-2}$] |
| Ultimate tensile stress | 56.9 [Nmm$^{-2}$] |
| Elongation at break | 355% |
| Preliminary softening at 19° C. | |

Example 5: (Comparison Example without Tegomer 6110®)

1320 g polytetramethylene glycol 2000 (Terathane 2000®) (having an OH number of 50.1 and a functionality of 2) were dehydrated as in Example 1 and polymerized with 718.7 g 4,4'-diisocyanatodicyclohexyl methane and 0.11 g dibutyl tin dilaurate to an NCO content of 8.5% by weight. After the addition of 0.11 g dibutyl tin dilaurate, 3.74 g ethylene bis-stearyl amide and 22 g 2,6ditert. butyl cresol, the product was chain-extended with 161.3 g butane-1,4-diol. After processing to test specimens, the material had the following properties:

| Hardness (Shore A) | 80 |
|---|---|
| Modulus 100% | 6.2 [Nmm$^{-2}$] |
| Modulus 300% | 11.3 [Nmm$^{-2}$] |
| Ultimate tensile stress | 36.7 [Nmm$^{-2}$] |
| Elongation at break | 585% |
| Preliminary softening: none | |

Example 6: (Comparison Example)

A mixture of 1102.4 g polytetramethylene glycol 2000 (Terathane 2000®) (having an OH number of 56.1 and a functionality (of 2) and 107.6 g polydimethyl siloxane 2000 (Tegomer 2311®) (having a OH number of 46 and a functionality of 2) was dehydrated for 1 hour at 120° C and prepolymerized with 782.24 g 4,4-diisocyanatodicyclohexyl methane and 0.11 g dibutyl tin dilaurate to an NCO content of 10.08% by weight.

After the addition of 11 g 2,6-tert.butyl cresol, 0.11 g dibutyl tin dilaurate and 8.8 g ethylene bis-stearyl amide, the product was chain-extended with 207.5 g butane-1,4-diol. After curing and processing, the material had the following properties:

| Hardness (Shore A) | 88 |
|---|---|
| Modulus 100% | 8.9 [Nmm$^{-2}$] |
| Modulus 300% | 14.7 [Nmm$^{-2}$] |
| Ultimate tensile stress | 38.6 [Nmm$^{-2}$] |
| Elongation at break | 563% |
| Preliminary softening: none | |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Segmented thermoplastic polyurethanes modified with siloxane block copolymers and based on relatively high molecular weight dihydroxy compounds, diisocyanates, and difunctional chain extenders, comprising the reaction product of a) a relatively high molecular weight dihydroxy compound having a molecular weight of from 800 to 8,000;

b) at least one isocyanate corresponding to the general formula:

OCN—Z—NCO, wherein Z represents: a difunctional organic radical;

c) at least one difunctional chain extender; and d) at least one substantially linear hydroxy-terminated polyol corresponding to the following formula:

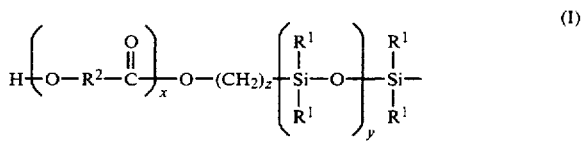

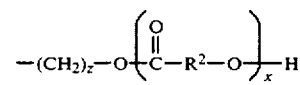

wherein
x represents: an integer of from 1 to 30,
y represents: an integer of from 1 to 50,
z represents: an integer of from 2 to 4,
R$^1$ represents: a C$_{1-6}$ alkyl group or a phenyl group, and
R$^2$ represents: a C$_{2-8}$ alkylene group.

2. The segmented thermoplastic polyurethanes of claim 1, wherein said component a) is selected from the group consisting of i) a polyether, ii) a polycarbonate, and iii) mixtures thereof.

3. The segmented thermoplastic polyurethanes of claim 2 wherein said component a) has a molecular weight of from 1,000 to 4,000.

4. The segmented thermoplastic polyurethanes of claim 1 wherein said component b) corresponds to the general formula:

OCN—Z—NCO, wherein Z represents: a cycloaliphatic radical.

5. The segmented thermoplastic polyurethanes of claim 1, wherein said component c) is selected from the group consisting of i) an aliphatic diol containing from 2 to 14 carbon atoms, and ii) a cycloaliphatic diamine containing from 2 to 14 carbon atoms.

6. The segmented thermoplastic polyurethanes of claim 5, wherein said component c) is selected from the group consisting of ethylene glycol, butane diol, hexane diol, 1,4-di(b-hydroxyethyl)-hydroquinone, isophorone diamine, and 4,4'-dicyclohexylmethane diamine.

7. The segmented thermoplastic polyurethanes of claim 1, wherein said y represents an integer of from 20 to 40, in said formula of said substantially linear hydroxy-terminated polyol.

8. The segmented thermoplastic polyurethanes of claim 7, wherein said y represents an integer of from 25 to 35, in said formula of said substantially linear hydroxy-terminated polyol.

9. The segmented thermoplastic polyurethanes of claim 1, wherein said substantially linear hydroxy-terminated polyol is present in a quantity of 1 to 20% by weight, based on the total quantity.

* * * * *